(12) United States Patent
Doerr et al.

(10) Patent No.: US 10,217,595 B2
(45) Date of Patent: Feb. 26, 2019

(54) DEVICE FOR SWITCHING AN ELECTRICAL CIRCUIT

(71) Applicant: Bayerische Motoren Werke Aktiengesellschaft, Munich (DE)

(72) Inventors: Alexander Doerr, Munich (DE); Thomas Hammerschmidt, Unterschleissheim (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 0 days.

(21) Appl. No.: 16/006,993

(22) Filed: Jun. 13, 2018

(65) Prior Publication Data

US 2018/0294130 A1    Oct. 11, 2018

Related U.S. Application Data

(63) Continuation of application No. PCT/EP2016/076769, filed on Nov. 7, 2016.

(30) Foreign Application Priority Data

Dec. 17, 2015  (DE) ................ 10 2015 225 521

(51) Int. Cl.
*H01H 85/46* (2006.01)
*H01H 39/00* (2006.01)
(Continued)

(52) U.S. Cl.
CPC .............. *H01H 85/46* (2013.01); *B60Q 9/00* (2013.01); *B60R 16/02* (2013.01); *H01H 39/004* (2013.01);
(Continued)

(58) Field of Classification Search
USPC ........................................ 340/438
See application file for complete search history.

(56) References Cited

U.S. PATENT DOCUMENTS 3,851,219 A   11/1974   Kozorezov et al.
4,266,258 A   6/1981   Eidinger et al.
(Continued)

FOREIGN PATENT DOCUMENTS

DE   23 62 807 A1   6/1975
DE   44 38 157 C1   12/1995
(Continued)

OTHER PUBLICATIONS

International Search Report (PCT/ISA/210) issued in PCT Application No. PCT/EP2016/076769 dated Jan. 19, 2017 with English translation (six (6) pages).
(Continued)

*Primary Examiner* — Eric Blount
(74) *Attorney, Agent, or Firm* — Crowell & Moring LLP

(57) ABSTRACT

A device is provided for switching an electrical circuit for electrical power levels of from 500 watts to 10 megawatts, which has two or more pyrotechnic disconnecting devices, which are connected in series between a terminal point and a load in order to interrupt the electrical circuit. The device also has at least one closing mechanism, wherein the number of closing mechanisms is less than the number of pyrotechnic disconnecting devices and wherein each closing mechanism is arranged in a parallel connection with a single pyrotechnic disconnecting device in order to bridge the one pyrotechnic disconnecting device and thereby close an interrupted electrical circuit.

13 Claims, 1 Drawing Sheet

(51) Int. Cl.
 *B60Q 9/00* (2006.01)
 *B60R 16/02* (2006.01)
 *H01H 85/00* (2006.01)

(52) U.S. Cl.
 CPC ....... *H01H 39/006* (2013.01); *H01H 85/0047* (2013.01); *H01H 2039/008* (2013.01)

(56) References Cited

U.S. PATENT DOCUMENTS

| | | | |
|---|---|---|---|
| 6,252,190 B1 | 6/2001 | Niemeyer | |
| 2006/0096486 A1 | 5/2006 | Roller et al. | |
| 2015/0248979 A1* | 9/2015 | Parks | H01H 39/004 200/61.08 |
| 2016/0049271 A1* | 2/2016 | Harrington | H01H 37/04 337/413 |
| 2016/0339784 A1 | 11/2016 | Birner et al. | |

FOREIGN PATENT DOCUMENTS

| | | |
|---|---|---|
| DE | 44 30 284 B4 | 3/2006 |
| DE | 10 2014 001 708 A1 | 8/2015 |
| EP | 1 020 886 A1 | 7/2000 |
| WO | WO 99/54904 A1 | 10/1999 |
| WO | WO 03/067621 A1 | 8/2003 |

OTHER PUBLICATIONS

German-language Written Opinion (PCT/ISA/210) issued in PCT Application No. PCT/EP2016/076769 dated Jan. 19, 2017 (seven (7) pages).

German-language Search Report issued in German Application No. 10 2015 225 521.2 dated Sep. 16, 2016 with partial English translation (twelve (12) pages).

\* cited by examiner

- Prior art -

DEVICE FOR SWITCHING AN ELECTRICAL CIRCUIT

CROSS REFERENCE TO RELATED APPLICATIONS

This application is a continuation of PCT International Application No. PCT/EP2016/076769, filed Nov. 7, 2016, which claims priority under 35 U.S.C. § 119 from German Patent Application No. 10 2015 225 521.2, filed Dec. 17, 2015, the entire disclosures of which are herein expressly incorporated by reference.

BACKGROUND AND SUMMARY OF THE INVENTION

The invention relates to a device for switching an electrical circuit, in particular for electric power levels of between 500 watts and 10 megawatts. The invention is specifically employed in an electrical infeed from an electrical energy store to the intermediate circuit of an electric drive system in an at least partially electrically-powered vehicle.

Devices of this type are employed for the positive and rapid interruption of high-current electrical circuits in the event of an emergency. A requirement applies to a switching device of this type, in that the tripping and interruption function thereof must be reliably guaranteed, with no maintenance, for a period of up to 20 years. Moreover, a circuit of this type must not give rise to any additional hazard potential associated with hot gas, particles, or an open-circuit voltage which is induced in the circuit in the disconnected state.

A potential field of application in motor vehicle engineering is the positive interruption of on-board cabling from the car battery immediately after an accident, in order to eliminate sources of ignition and plasma interference which occur when, for example, cable insulation has been abraded during an accident, or exposed cable ends are compressed against each other or against sheet metal, and abraded accordingly. If an accident is associated with the simultaneous escape of gasoline, such sources of ignition can ignite combustible mixtures of air and gasoline which accumulate, for example, under the engine hood. A further field of application is the electrical disconnection of a subassembly from the on-board network in the event of a short-circuit in the subassembly concerned, for example, in an electric pre-heater.

Pyrotechnic fuses or disconnecting devices for the switching of high currents are known from the prior art.

DE 44 381 57 C1 relates to a pyrotechnic disconnecting device with a propelling charge, the gases of which act on a working part which is arranged for free longitudinal movement in a housing. The working part stores the energy generated in the propellant gases and, in free-floating motion, acts on the material to be separated. Upon the separation of the material, the working part surrenders its stored energy.

WO 03/067621 A1 relates to an electrical switching device, specifically for the switching of high currents, having a housing, which comprises a contact unit, wherein the contact unit comprises two terminal contacts, which are bonded to the housing in a stationary arrangement or configured as an integral element thereof, for the infeed and outfeed of an electric current to be switched, and wherein the first two terminal contacts, in the initial state of the switching device, are connected within the housing in an electrically conductive manner, having an activatable material arranged in the housing which, further to activation, generates a gas pressure for the pressurization of the contact unit, wherein the electrically conductive connection is interrupted by the action of pressurization associated with the gas pressure, wherein the contact unit comprises a contact element which is moveable relative to the stationary terminal contacts in response to pressurization by the gas pressure generated and which, by the action of pressurization by the gas pressure generated, is moved in the direction of the axis of the contact unit from an initial position to a terminal position, in which the electrical connection via the contact unit is interrupted.

WO 99/54904 relates to a device for the interruption of an electrical circuit, specifically for high current ratings, having a housing, in which at least one electrical conductor element is arranged, which incorporates a separating region and which can be switched into the electrical circuit to be interrupted such that the electrical circuit to be interrupted is routed via the conductor element, and having activatable means which are arranged in or on the housing for the generation of a tripping pressure which acts on the separating region, directly and/or by means of a sabot which pressurizes the separating region in its initial position, wherein the separating region and/or the sabot are configured such that, further to the activation of said means, the separating region is completely interrupted or severed, or the cross section of the separating region is reduced.

DE 44 30 284 B4 relates to a safety device for a motor vehicle, having a disconnecting device which is actuatable by means of at least one accident sensor, by means of which an electrical energy source can be disconnected from an on-board network of the motor vehicle, and having disconnecting means which are subject to the action of propulsive energy, by means of which a conductor in the on-board network can be separated in a manner which interrupts the current flow, wherein, as disconnecting means, a rupture element is provided which is subject to the action of propulsive energy and which functions as a conductor.

If a pyrotechnic disconnecting device according to the prior art is tripped, the interruption of an electrical circuit thus tripped is irreversible under normal circumstances. Thus, in the case of an application in a motor vehicle, the owner of the motor vehicle will generally require the services of a specialized workshop for the replacement of the tripped pyrotechnic disconnecting device. If the interruption of an electrical circuit involves the feeder between the electrical energy store and the intermediate circuit which serves an electric drive system, in general, it will no longer be possible to operate the vehicle by means of the electric drive system.

The object of the invention is the provision of an improved device for the switching of an electrical circuit. Specifically, a further object of the invention is to permit the propulsion of a vehicle using an electric drive system with a tripped pyrotechnic disconnecting device, at least for an interim period.

This object is fulfilled by a device for the switching of an electrical circuit, by a vehicle having such a device, and by a method for operating such a device. Advantageous configurations thereof are described below.

A first aspect of the invention relates to a device for switching an electrical circuit, in particular for electric power levels of between 500 watts and 10 megawatts, which preferably has two or four pyrotechnic disconnecting devices, which are connected in series between a terminal point and a load in order to interrupt the electrical circuit. Moreover, the device preferably comprises at least one closing mechanism, in particular three closing mechanisms, wherein the number of closing mechanisms is also preferably lower than the number of pyrotechnic disconnecting devices, and wherein each closing mechanism is arranged in a parallel connection with, in each case, a single pyrotechnic disconnecting device in order to bridge the one pyrotechnic disconnecting device, and thereby close an interrupted electrical circuit.

A second aspect of the invention relates to a vehicle, specifically an electric or hybrid vehicle, having a device according to the invention for the switching of an electrical circuit, wherein this device is arranged between an electrical energy store and a load, specifically between the electrical energy store and an intermediate circuit.

A third aspect of the invention relates to a method for operating a device according to the invention for switching an electrical circuit, wherein an interruption of the electrical circuit by the tripping of one of the at least two pyrotechnic disconnecting devices in response to a specific event, specifically in an emergency situation, is preferably succeeded by the following steps:

checking whether said specific event has been terminated; and closing of the at least one closing mechanism which is connected in parallel with the tripped pyrotechnic disconnecting device, in order to bridge the tripped pyrotechnic disconnecting device and thereby close the interrupted electrical circuit; and/or generation of a status notification for the device, specifically an indication for the attention of the driver of the vehicle.

The characteristics and advantages of the first aspect of the invention described hereinafter, and advantageous configurations thereof, shall also apply to the second and third aspects of the invention and to advantageous configurations thereof, and vice versa.

The invention is specifically based upon the principle whereby, additionally to a pyrotechnic disconnecting device, a closing mechanism is provided for the closing of a parallel electrical circuit which is arranged in parallel with the pyrotechnic disconnecting device, thereby bridging the tripped pyrotechnic disconnecting device. Accordingly, an electric load, specifically an electric drive system of a vehicle, can be maintained in service, at least for an interim period. This can permit, for example, the vehicle to be driven into an emergency lane or to the nearest repair workshop, or the operation of a service function which is otherwise required further to the tripping of one pyrotechnic disconnecting device to be prolonged until a plurality of pyrotechnic disconnecting devices have been tripped. Preferably, in order to ensure the operational security of the load or of the vehicle in which said load is installed during this time-limited service, the device always incorporates one more pyrotechnic disconnecting device than the number of closing mechanisms which are provided. Accordingly, the affected electrical circuit continues to be protected by a pyrotechnic disconnecting device.

The solution according to the invention firstly enhances the road safety of an electric vehicle, as the latter can continue to operate in an emergency situation and can be driven, for example, out of an exposed position in traffic following an accident. Moreover, by means of the device according to the invention, workshop costs can be saved, for example where the tripping of the pyrotechnic disconnecting device involves an instance of spurious tripping.

In one advantageous configuration, the at least one closing mechanism is a pyrotechnic contactor. Pyrotechnic contactors have a very short response time, and thus permit the rapid closing of an electrical circuit which has been interrupted by the spurious actuation of a pyrotechnic disconnecting device and, accordingly, the prompt resumption of service of the load.

In a further advantageous configuration of the device according to the invention, the at least two pyrotechnic disconnecting devices are in a normally closed state, and the at least one closing mechanism is in a normally open state. A normal state within the meaning of the invention is a state in which the device can be operated in normal duty.

In a further advantageous configuration of the device according to the invention having at least two closing mechanisms and at least three pyrotechnic disconnecting devices, a contact between two respective series-connected pyrotechnic disconnecting devices in a first parallel circuit comprised of a first pyrotechnic disconnector and a first closing mechanism, and a second parallel circuit comprised of a second pyrotechnic disconnector and a second closing mechanism, is commonly employed. This permits an exceptionally space-saving arrangement of the individual elements in the device according to the invention, wherein the individual circuits are employed in a multiple manner.

In an advantageous configuration of the vehicle according to the invention, the terminal point is connected to the negative pole of the electrical energy store.

In an advantageous configuration of the method according to the invention, the interruption of the electrical circuit by the tripping of a further pyrotechnic disconnecting device is preferably succeeded by the following steps:

checking whether the specific event has been terminated; and closing of at least one further closing mechanism which is connected in a further parallel circuit to the further tripped pyrotechnic disconnecting device, in order to bridge the further tripped pyrotechnic closing device and thereby close the interrupted electrical circuit; and/or generation of a status notification for the device, specifically an indication for the attention of the driver of the vehicle.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
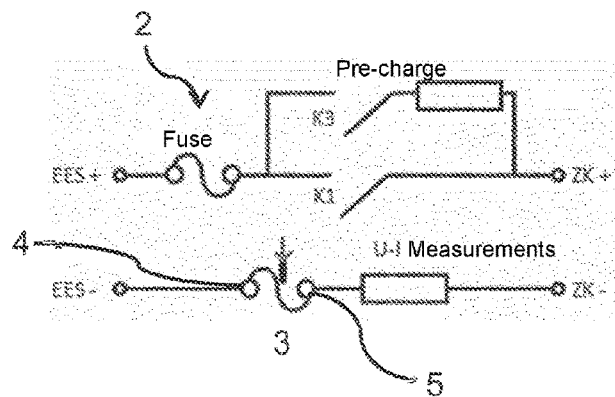
FIG. 1 shows an electrical circuit from the prior art.

FIG. 1 represents an example from the prior art, in which a pyrotechnic disconnecting device or a pyrotechnic disconnector is arranged in the negative branch of an electrical circuit between a negative pole of an electrical energy store (EES-), which is connected to a terminal point 4, and a terminal point 5 to a negative pole of an intermediate circuit ZK-, in which an electrical load is arranged. The electrical circuit 2 represented corresponds to a circuit which can be employed, for example, for the supply of energy to an electric drive system.

Figure 2:
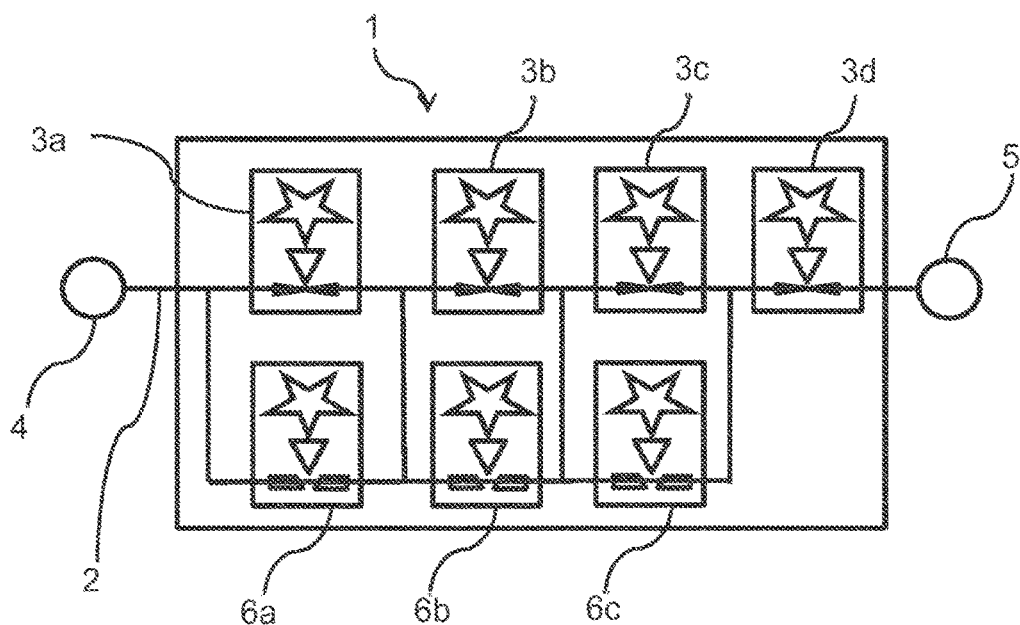
FIG. 2 shows a partial schematic representation of one form of embodiment of a device for switching an electrical circuit according to the first aspect of the invention.

FIG. 2 represents one form of embodiment of a device according to the invention for the switching of an electrical circuit 2 which, in an exemplary circuit according to FIG. 1, is arranged in place of the disconnecting device 3. The form of embodiment represented incorporates four pyrotechnic disconnecting devices 3a, 3b, 3c, 3d, which are connected to a load in series between the terminal point 4 and the contact point 5. Each of the pyrotechnic disconnecting devices 3a, 3b, 3c, 3d can interrupt the electrical circuit (2) by means of a pyrotechnic reaction, which is represented by a star, wherein a working part or separator, specifically a wedge (represented as a triangle), is driven through the electrical circuit 2. At this point, the electrical circuit 2 can no longer be closed, until the respective pyrotechnic disconnecting device 3a, 3b, 3c, 3d which has been tripped has been replaced. In general, this replacement can only be undertaken by an expert, and must be executed in the case of a motor vehicle in a specialized workshop.

According to the invention, each of the three pyrotechnic disconnecting devices 3a, 3b, 3c is respectively associated with a closing mechanism 6a, 6b, 6c in a parallel circuit arrangement. Whereas the pyrotechnic disconnecting devices 3a, 3b, 3c, 3d, in their normal state, i.e. in the normal duty of the electrical circuit 2, each constitute a closed electrical switch, the closing mechanisms 6a, 6b, 6c each constitute an open electrical switch.

If, for example, the pyrotechnic disconnecting device 3a is now tripped, in order to interrupt the electrical circuit 2 of an electrical energy store (EES) for safety reasons, this electrical circuit 2 can be reconstituted thereafter, by the activation or closing of the closing mechanism 6a. The switching circuit 2 is then routed via the parallel circuit which is associated with the pyrotechnic disconnecting device 3a and incorporates the closing mechanism 6a. The closing mechanism 6a, as represented, can be configured as a pyrotechnic contactor but, alternatively, can be configured as an all-or-nothing relay. If a second safety-critical state occurs thereafter, the electrical circuit 2 can be interrupted, for example by the pyrotechnic disconnecting device 3b. This interruption can, in turn, be bridged by means of a closing mechanism 6b. Correspondingly, a further interruption of the electrical circuit 2 by the pyrotechnic disconnecting device 3c can be bridged by means of a closing mechanism 6c.

The pyrotechnic disconnecting device 3d functions as the final safety device, which interrupts the electrical circuit 2 and cannot be bridged thereafter. At the latest, upon the tripping of the pyrotechnic disconnecting device 3c, or of any other penultimate intact pyrotechnic disconnecting device in the device 1 according to the invention, the driver of a vehicle in which the device according to the invention is installed will be required to consult a specialized workshop, in order to instruct the replacement of the safety device or to establish the reasons for the occurrence of safety-related interruptions in the electrical circuit 2.

List of reference symbols

Device 1
Circuit 2
Pyrotechnic disconnecting device 3; 3a, 3b, 3c, 3d
Terminal point 4
Contact point 5
Closing mechanism 6a, 6b, 6c The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A device for switching an electrical circuit for electric power levels of between 500 watts and 10 megawatts, comprising:
   at least two pyrotechnic disconnecting devices, which are connected in series between a terminal point of an electrical energy supply and a contact point of an intermediate circuit of a load, in order to interrupt the electrical circuit; and
   at least one closing mechanism;
   wherein a number of closing mechanisms is lower than a number of pyrotechnic disconnecting devices; and
   wherein the at least one closing mechanism is arranged in a parallel connection with a single one of the pyrotechnic disconnecting devices in order to bridge the single pyrotechnic disconnecting device and close an interrupted electrical circuit.

2. The device as claimed in claim 1, wherein the at least one closing mechanism is a pyrotechnic contactor.

3. The device as claimed in claim 1, wherein the at least two pyrotechnic disconnecting devices are in a normally closed state, and the at least one closing mechanism is in a normally open state.

4. The device as claimed in claim 1, having at least two closing mechanisms and at least three pyrotechnic disconnecting devices, wherein at least one contact between two respective series-connected pyrotechnic disconnecting devices in a first parallel circuit comprised of a first pyrotechnic disconnecting device and a first closing mechanism, and a second parallel circuit comprised of a second pyrotechnic disconnecting device and a second closing mechanism, is employed.

5. An electric or hybrid vehicle having the device as claimed in claim 1, wherein the device is arranged between an electrical energy store and an intermediate circuit in the electric or hybrid vehicle.

6. The vehicle as claimed in claims 5, wherein the terminal point is connected to a negative pole of the electrical energy store.

7. The device as claimed in claim 2, wherein the at least two pyrotechnic disconnecting devices are in a normally closed state, and the at least one closing mechanism is in a normally open state.

8. The device as claimed in claim 2, having at least two closing mechanisms and at least three pyrotechnic disconnecting devices, wherein at least one contact between two respective series-connected pyrotechnic disconnecting devices in a first parallel circuit comprised of a first pyrotechnic disconnecting device and a first closing mechanism, and a second parallel circuit comprised of a second pyrotechnic disconnecting device and a second closing mechanism, is employed.

9. The device as claimed in claim 3, having at least two closing mechanisms and at least three pyrotechnic disconnecting devices, wherein at least one contact between two respective series-connected pyrotechnic disconnecting devices in a first parallel circuit comprised of a first pyrotechnic disconnecting device and a first closing mechanism, and a second parallel circuit comprised of a second pyrotechnic disconnecting device and a second closing mechanism, is employed.

10. A method for operating a device in a vehicle that switches an electrical circuit for electric power levels of between 500 watts and 10 megawatts, the device including at least two pyrotechnic disconnecting devices, which are connected in series between a terminal point of an electrical energy supply and a contact point of an intermediate circuit of a load, in order to interrupt the electrical circuit; and at least one closing mechanism; wherein a number of closing mechanisms is less than a number of pyrotechnic disconnecting devices; and wherein the at least one closing mechanism is arranged in a parallel connection with a single one of the pyrotechnic disconnecting devices in order to bridge the single pyrotechnic disconnecting device and close an interrupted electrical circuit that was interrupted by tripping one of the at least two pyrotechnic disconnecting devices in response to a specific event, the method comprising:

checking whether the specific event has been terminated;

closing the at least one closing mechanism which is connected in parallel with the tripped pyrotechnic disconnecting device, in order to bridge the tripped pyrotechnic disconnecting device and close the interrupted electrical circuit; and generating a status notification of the device for a driver of the vehicle.

11. The method as claimed in claim 10, wherein the interruption of the electrical circuit by the tripping of a further pyrotechnic disconnecting device, which is connected in parallel with a closing mechanism, further comprising:

checking whether the specific event has been terminated;

closing at least one further closing mechanism which is connected in another parallel circuit to the further tripped pyrotechnic disconnecting device, in order to bridge the further tripped pyrotechnic disconnecting device and close the interrupted electrical circuit; and generating another status notification of the device for the driver of the vehicle.

12. A non-transitory computer-readable medium storing a program incorporating instructions which, upon execution thereof by a computer, cause the computer to:

check whether a specific event, which tripped at least one pyrotechnic disconnecting device disposed in a device in a vehicle that switches an electrical circuit for electric power levels of between 500 watts and 10 megawatts, has been terminated;

close at least one closing mechanism which is connected in parallel with the tripped pyrotechnic disconnecting device, in order to bridge the tripped pyrotechnic disconnecting device and close the interrupted electrical circuit; and generate a status notification of the device for a driver of a vehicle.

13. The non-transitory computer-readable medium as claimed in claim 12, wherein the program incorporates instructions that further cause the computer to:

check again whether the specific event has been terminated;

close at least one further closing mechanism which is connected in another parallel circuit to the further tripped pyrotechnic disconnecting device, in order to bridge the further tripped pyrotechnic disconnecting device and close the interrupted electrical circuit; and generate another status notification of the device for the driver of the vehicle.

\* \* \* \* \*